(12) United States Patent
Keithley et al.

(10) Patent No.: US 8,306,363 B2
(45) Date of Patent: *Nov. 6, 2012

(54) METHODS AND SYSTEMS FOR IMAGE SCALING

(75) Inventors: Douglas G. Keithley, Boise, ID (US);
David A. Bartle, Boise, ID (US)

(73) Assignee: Marvell International Technology Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,411

(22) Filed: Feb. 17, 2012

(65) Prior Publication Data

US 2012/0154829 A1    Jun. 21, 2012

Related U.S. Application Data

(63) Continuation of application No. 12/730,954, filed on Mar. 24, 2010, now Pat. No. 8,121,436, which is a continuation of application No. 11/254,430, filed on Oct. 20, 2005, now Pat. No. 7,706,635.

(51) Int. Cl.
*G06K 9/32* (2006.01)
*G06K 9/56* (2006.01)

(52) U.S. Cl. .......... 382/299; 382/205; 382/298

(58) Field of Classification Search .......... 382/195, 382/205, 298, 300
See application file for complete search history.

(56) References Cited

U.S. PATENT DOCUMENTS

| | | | |
|---|---|---|---|
| 4,032,978 A * | 6/1977 | Wong | 358/3.23 |
| 5,204,753 A * | 4/1993 | Tai | 358/3.24 |
| 5,260,807 A * | 11/1993 | Tai | 358/3.21 |
| 5,606,632 A | 2/1997 | Matsumoto et al. | |
| 5,650,858 A * | 7/1997 | Lund | 358/3.15 |
| 5,655,174 A * | 8/1997 | Hirst | 399/27 |
| 5,777,758 A * | 7/1998 | Tanabe | 358/1.9 |
| 5,852,470 A * | 12/1998 | Kondo et al. | 348/448 |
| 5,952,994 A | 9/1999 | Ong et al. | |
| 5,959,656 A * | 9/1999 | Dhong et al. | 347/254 |
| 5,966,560 A * | 10/1999 | Kodama et al. | 399/66 |
| 6,342,910 B1 * | 1/2002 | Sakamoto et al. | 347/131 |
| 6,503,004 B2 * | 1/2003 | Togami | 400/63 |
| 7,120,309 B2 * | 10/2006 | Garcia | 382/275 |
| 7,171,059 B1 * | 1/2007 | Wang et al. | 382/300 |
| 7,706,635 B2 * | 4/2010 | Keithley et al. | 382/299 |
| 8,121,436 B2 * | 2/2012 | Keithley et al. | 382/299 |
| 2002/0076121 A1 * | 6/2002 | Shimizu et al. | 382/300 |
| 2004/0160643 A1 * | 8/2004 | Sugizaki | 358/3.06 |
| 2007/0092162 A1 * | 4/2007 | Keithley et al. | 382/298 |
| 2008/0013136 A1 * | 1/2008 | Yano et al. | 358/532 |

OTHER PUBLICATIONS

Hall, C.A.E. et al., "Inkjet Printer Print Quality Enhancement Techniques," Hewlett-Packard Journal, Feb. 1994, pp. 35-40.

* cited by examiner

*Primary Examiner* — John Strege (57) ABSTRACT

A controller for scaling an input image is provided. The controller selects a pixel neighborhood that includes a plurality of pixels neighboring a pixel. The controller compares at least part of the pixel neighborhood to a pattern. If the pattern is present in the pixel neighborhood, the controller applies a scaling algorithm to at least a portion of the pixel neighborhood in order to obtain a scaled image. The controller also selects another pixel neighborhood that includes a plurality of pixels neighboring a pixel in the scaled image, and compares at least part of the another pixel neighborhood to another pixel pattern. If the another pixel pattern is present in the another pixel neighborhood, the controller applies a correction algorithm to at least a portion of the another pixel neighborhood in order to obtain a processed scaled image.

20 Claims, 10 Drawing Sheets

For a 5 row, 3 column window around the pixel of interest ('h'):

row 1: | a | b | c |
row 2: | d | e | f | — 10
row 3: | g | h | i |
row 4: | k | m | n | — 15
row 5: | p | q | r |

For a 5 row, 3 column window around the pixel of interest ('h'):

row 1: | a | b | c |
row 2: | d | e | f |  — 10
row 3: | g | h | i |
row 4: | k | m | n |  — 15
row 5: | p | q | r |

FIG. 1

Equations:
$X = A*(2/3) + B*(1/3)$
$Y = B*(1/3) + C*(2/3)$

FW: 1 LUT minimum
TIE: 1-2 LUTs

FIG. 2a

Equations:
$X = A*(3/4) + B*(1/4)$
$Y = B*(2/4) + C*(2/4)$
$Z = C*(1/4) + D*(3/4)$ FW: 2 LUTs minimum
TIE: 2-3 LUTs

Equations:
$W = A*(3/5)+B*(2/5)$
$X = B*(1/5)+C*(3/5)+D*(1/5)$
$Y = D*(2/5)+E*(3/5)$ FW: LUT needs 3 ROWS
TIE: 2-3 LUTs

Fig. 2d

Equations:
V = A*(5/6) + B*(1/6)
W = B*(4/6) + C*(2/6)
X = C*(3/6) + D*(3/6)
Y = D*(2/6) + E*(4/6)
Z = E*(1/6) + F*(5/6)

FW: 3 LUTs minimum

Equations:
T = A*(7/8) + B*(1/8)
U = B*(6/8) + C*(2/8)
V = C*(5/8) + D*(3/8)
W = D*(4/8) + E*(4/8)
X = E*(3/8) + F*(5/8)
Y = F*(2/8) + G*(6/8)
Z = G*(1/8) + H*(7/8)

FW: 4 LUTs minimum

Toner Explosion
Top:
row 1:
row 2:
row 3:
row 4:
row 5:

FIG. 3a

Toner Explosion
Bottom:

row 1:
row 2:
row 3:
row 4:
row 5:

| 1 | 1 | 1 |
|---|---|---|
| 1 | 1 | 1 |
| 1 | 1 | 1 |
| 1 | 1 | 1 |
| 0 | 0 | 0 |

METHODS AND SYSTEMS FOR IMAGE SCALING

This application is a continuation application of U.S. patent application Ser. No. 12/730,954, filed on Mar. 24, 2010 and issued as U.S. Pat. No. 8,121,436, which is a continuation application of U.S. patent application Ser. No. 11/254,430, filed on Oct. 20, 2005 and issued as U.S. Pat. No. 7,706,635, both hereby incorporated by reference in their entirety.

BACKGROUND OF THE INVENTION

Due to the ease of use and the proliferation of digital devices, the number of print devices (also referred to as printers) in use has increased in recent years. One usual operation in a printer is the scaling of an image to be printed. Scaling, as used herein, refers to the change in the number of pixels and is usually described by the ratio of the number of pixels in the input image to the number of pixels in the output image. For example, if for every three consecutive pixels in a column of the input image there are two consecutive pixels in the corresponding column of the output image, the scaling is referred to as 3:2 scaling.

Scaling is conventionally performed on the input image pixel data onto pixel by pixel basis. In one instance, the input image pixels are individually "windowed" by selecting a small window of the input image pixels that surround the pixel that is being processed for scaling. The pixel data for the pixel in the scaled (output) image is derived from the values of the pixel data of the input image pixel that is being processed and selected ones of the input image pixels located in the "window."

However, typically, the scaling operation requires extensive computation or arithmetic operations on the pixel data of the pixel being processed and the surrounding pixels. In conventional methods, the window of the input image pixels that surrounds the pixel being processed is small and the computations or arithmetic operations are performed using dedicated hardware or processors and software instructions.

Alternatively, the scaling processing instructions can be described in software. The software can then be embodied into a computer memory in the printer. (Software when used as a permanent part of a device is referred to as "firmware" or "microcode.") Performing the scaling operation solely using software can be typically slow as compared to using dedicated hardware.

There is therefore a need to provide methods and systems for performing the scaling operations that provide the advantages of both dedicated hardware and of software while avoiding the disadvantages of either a dedicated hardware or software.

BRIEF SUMMARY OF THE INVENTION

One embodiment of the method of this invention includes selecting one pixel from the input image, selecting a pixel neighborhood including a number of pixels on the input image in neighboring the selected pixel, and comparing the pixel neighborhood to a predetermined pattern in order to determine whether the predetermined pattern is present in the pixel neighborhood. If the predetermined pattern is present in the pixel neighborhood, a predetermined scaling algorithm is applied to some of the pixels from the pixel neighborhood and scaled image pixel data is obtained from the application of the predetermined scaling algorithm.

An embodiment of the system of this invention includes a computing component capable of comparing a pixel neighborhood from the input image to a pattern to determine if the pattern is present in the pixel neighborhood and a computer usable medium having computer readable code embodied therein, the computer readable code being capable of causing the computing component to, if the pattern is present in the pixel neighborhood, obtain, from input image data of at least some pixels from the pixel neighborhood, scaled image pixel data by applying a predetermined scaling algorithm.

For a better understanding of the present invention, together with other and further needs thereof, reference is made to the accompanying drawings and detailed description and its scope will be pointed out in the appended claims.

DETAILED DESCRIPTION OF THE INVENTION

Unless defined otherwise below, all technical and scientific terms used herein have the same meaning as commonly understood by one of ordinary skill in the art to which this invention belongs. Still, certain terms are defined herein for the sake of clarity.

The following definitions are provided for specific terms that are used in the following written description.

A lookup table ("LUT"), as used herein, refers to a table detailing data for an output image pixel for corresponding input image pixel data. For example, this invention not being limited to this example, if X represents the data for an output image pixel, and A and B represent data for two input image pixels used to obtain X, and if X is given by $$X = A*(2/3) + B*(1/3), \text{ and}$$

A and B are represented by 2 bits per pixel (that is, in binary A and B have values 00, 01, 10, 11 or in decimal 0, 1, 2, 3), then the look-up table is given by

|   |   | B pixel data |   |   |   |
|---|---|---|---|---|---|
|   |   | 0 | 1 | 2 | 3 |
| A | 0 | 0 | 1/3 | 2/3 | 1 |
| pixel | 1 | 2/3 | 1 | 4/3 | 5/3 |
| data | 2 | 4/3 | 5/3 | 2 | 7/3 |
|   | 3 | 2 | 7/3 | 8/3 | 3 |

In one instance, X may be an integer and the integer values would be used.

A "Toner scatter compensation" algorithm, as used herein, refers to an algorithm to correct for artifacts caused by toner that is scattered when moisture in the media suddenly vaporizes.

In one embodiment, the "Toner scatter compensation" bottom algorithm replaces the pixel values for the inner pixels in the row preceding the last row that does not completely have all pixel data equal to zero with a reduced pixel value. In an exemplary embodiment, this invention not being limited only to this embodiment, for an input image that has 7 columns and 8 rows (shown below)

| 0 | 1 | 1 | 1 | 1 | 1 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 | the output after applying the "toner scatter compensation" is

| 0 | 1 | 1 | 1 | 1 | 1 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 0.6 | 0.6 | 0.6 | 1 | 0 |
| 0 | 1 | 1 | 1 | 1 | 1 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

In one embodiment of the method for scaling an input image of this invention, the input image is scaled by applying a predetermined scaling algorithm after detection of a specific pattern of pixels. The embodiment of the method of this invention includes recognition of a pattern in a group or neighborhood of pixels from the input image and, after recognition of pattern, applying a predetermined scaling algorithm. The steps in this embodiment of the method of this invention include selecting one pixel from the input image, selecting a pixel neighborhood including a number of pixels on the input image in neighboring the selected pixel, and comparing the pixel neighborhood to a predetermined pattern in order to determine whether the predetermined pattern is present in the pixel neighborhood. If the predetermined pattern is present in the pixel neighborhood, a predetermined scaling algorithm is applied to some of the pixels from the pixel neighborhood and scaled image pixel data is obtained from the application of the predetermined scaling algorithm.

In one instance, the predetermined scaling algorithm includes providing pixel data from at least two pixels in the input image and obtaining, from at least one look-up table, pixel data for at least one pixel in the scaled image.

In many embodiments, scaling down requires multiplying the input pixel data for some of the input pixels by a scaling factor, which can be different for a number of combinations of input pixels. For example, the present invention not being limited to this example, if the scale factor of 0.91 is desired for a single dimension of an image (that is, for every 100 pixels in the dimension to be scaled, the output image has 91 pixels in that dimension), the scaling relationship is given by $O1=0.91*I1+0.09*I2$ $O2=0.82*I2+0.18*I3$ $O3=0.73*I3+0.27*I4$ for the first of the output pixel:
where O1, O2, O3 are the pixel data for the first three output image pixels, and I1, I2, I3, I4 at the pixel data for the first four input image pixels. There would be 88 more equations for the remaining corresponding 88 output image pixels. For an arbitrary scaling factor, a large number of equations (91 in the above example) will be required.

In many embodiments, the scaling factors can be limited to a finite number of scaling factors of limited extent (such as, but not limited to, 3:2, 4:3, 5:4, 5:3, 6:5). For that finite number of scaling factors of limited extent, the pixel data for the scaled image can be pre-calculated and stored in a lookup table for each scaling factor. A finite number of lookup tables of limited extent can be used to obtain the scaled image for any of the finite number of scaling factors. It should be noted that the scaling function does not have to be linear. A nonlinear scaling function can be used, pre-calculated, and stored in a lookup table. The use of nonlinear scaling functions enables the compensation of printing nonlinearities.

Figure 1:
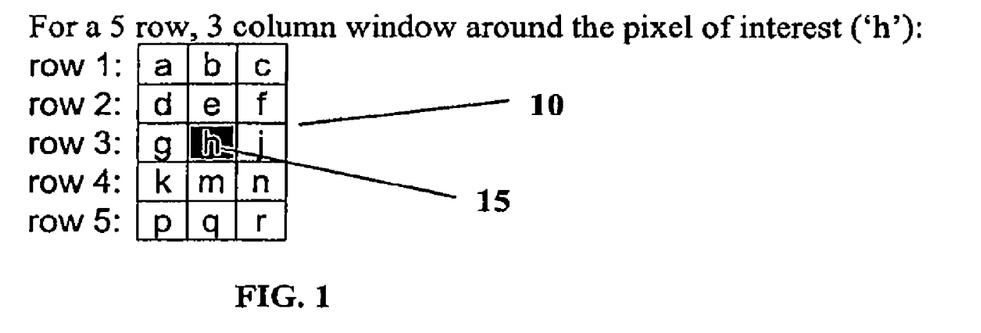
FIG. 1 is a schematic pictorial representation of exemplary neighborhood of pixels as used in this invention.

An exemplary neighborhood 10 of pixels, a 5 row and 3 column neighborhood (window) 10 around a pixel of interest 15, "h," is shown in FIG. 1. An exemplary pattern 20 of three rows of pixels from the input image is shown in the left-hand side of FIG. 2a (labeled as "in"), corresponding to 3:2 scaling. After that pattern of three rows of pixels in one column (pixels A, B, C in FIG. 2a) is identified (is determined to be present) in the neighborhood, the following algorithm for a two bits per pixel input image provides the corresponding two pixels (pixels X and Y in FIG. 2a) in the corresponding column of the scaled image $X=A*(\frac{2}{3})+B*(\frac{1}{3})$, $Y=C*(\frac{2}{3})+B*(\frac{1}{3})$.

Figure 2A:
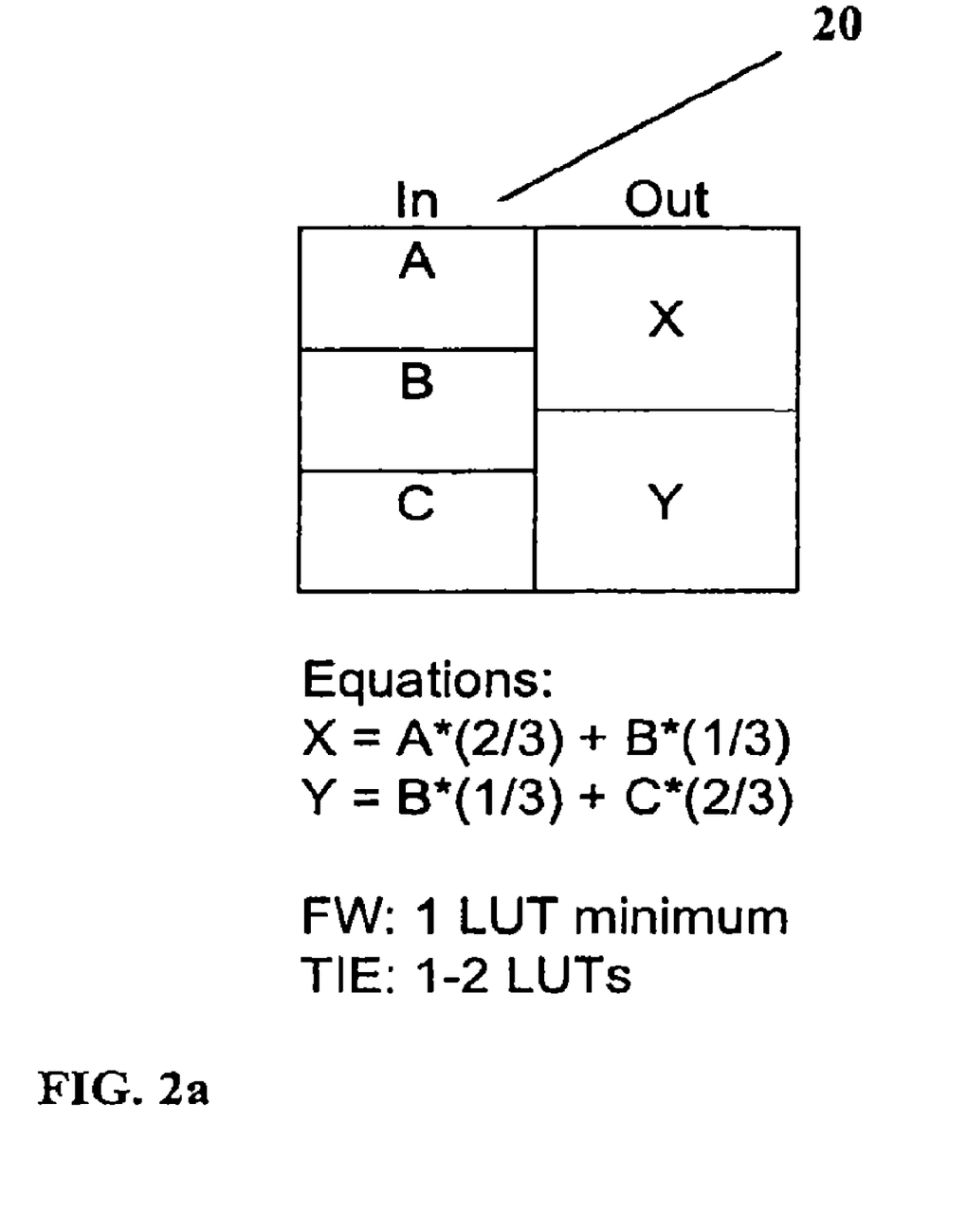
FIGS. 2a-2f are schematic pictorial representation of exemplary embodiments of patterns and scaling algorithms.

Since the coefficients are the same in both of the above equations, only one lookup table (LUT) can suffice although both lookup tables can be provided. The LUT that provides X from A and B is a given, in one instance (for a two bits per pixel input), herein above.

Figure 2B:
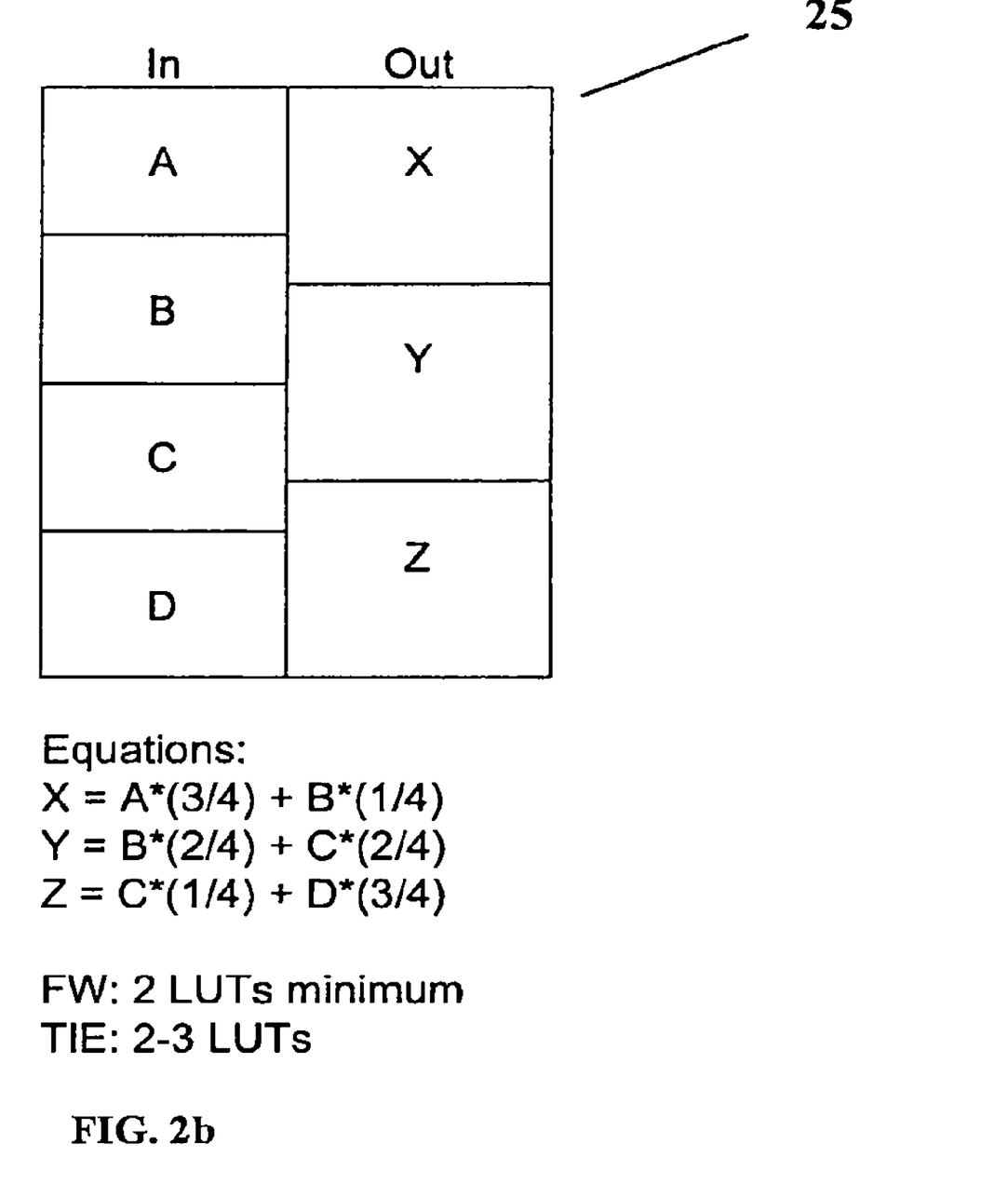
Figure 2C:
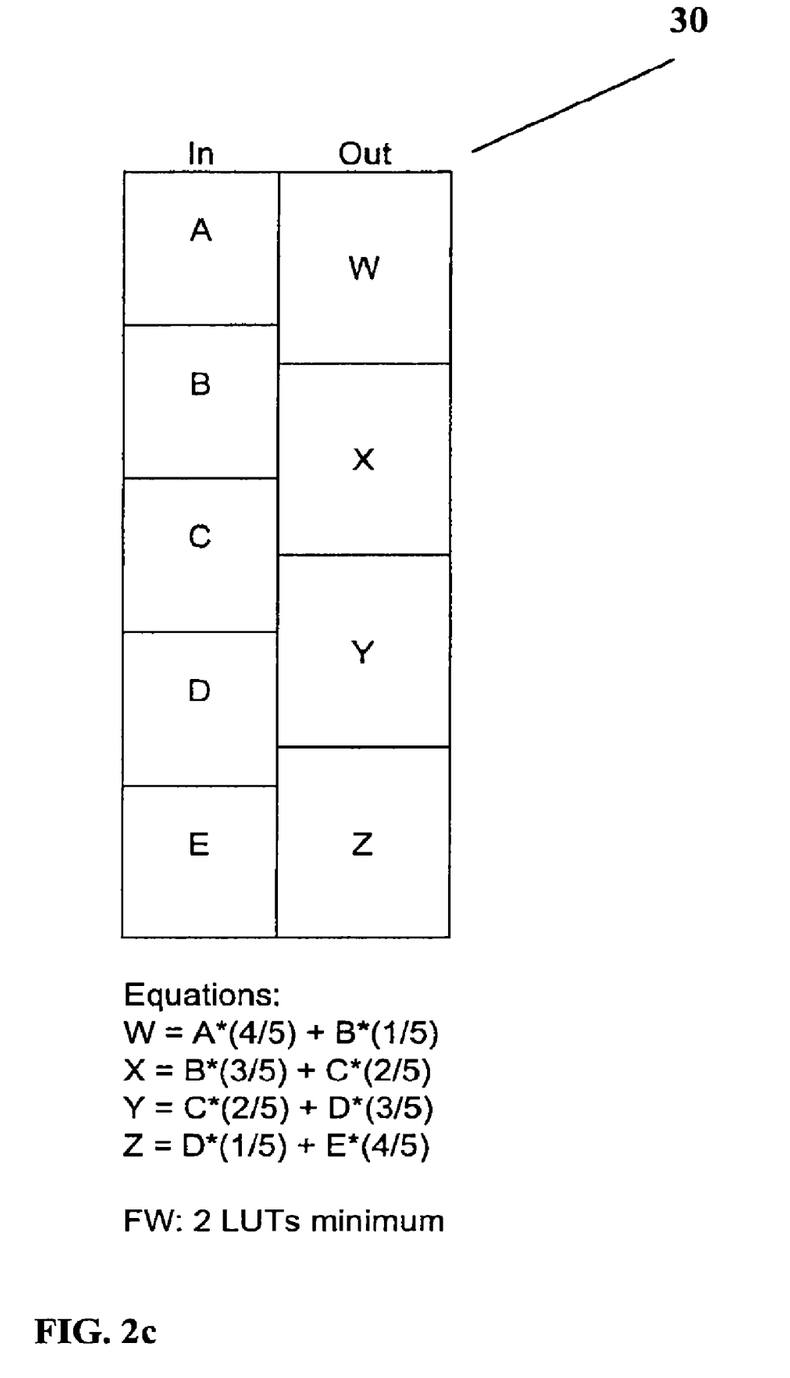
Figure 2D:
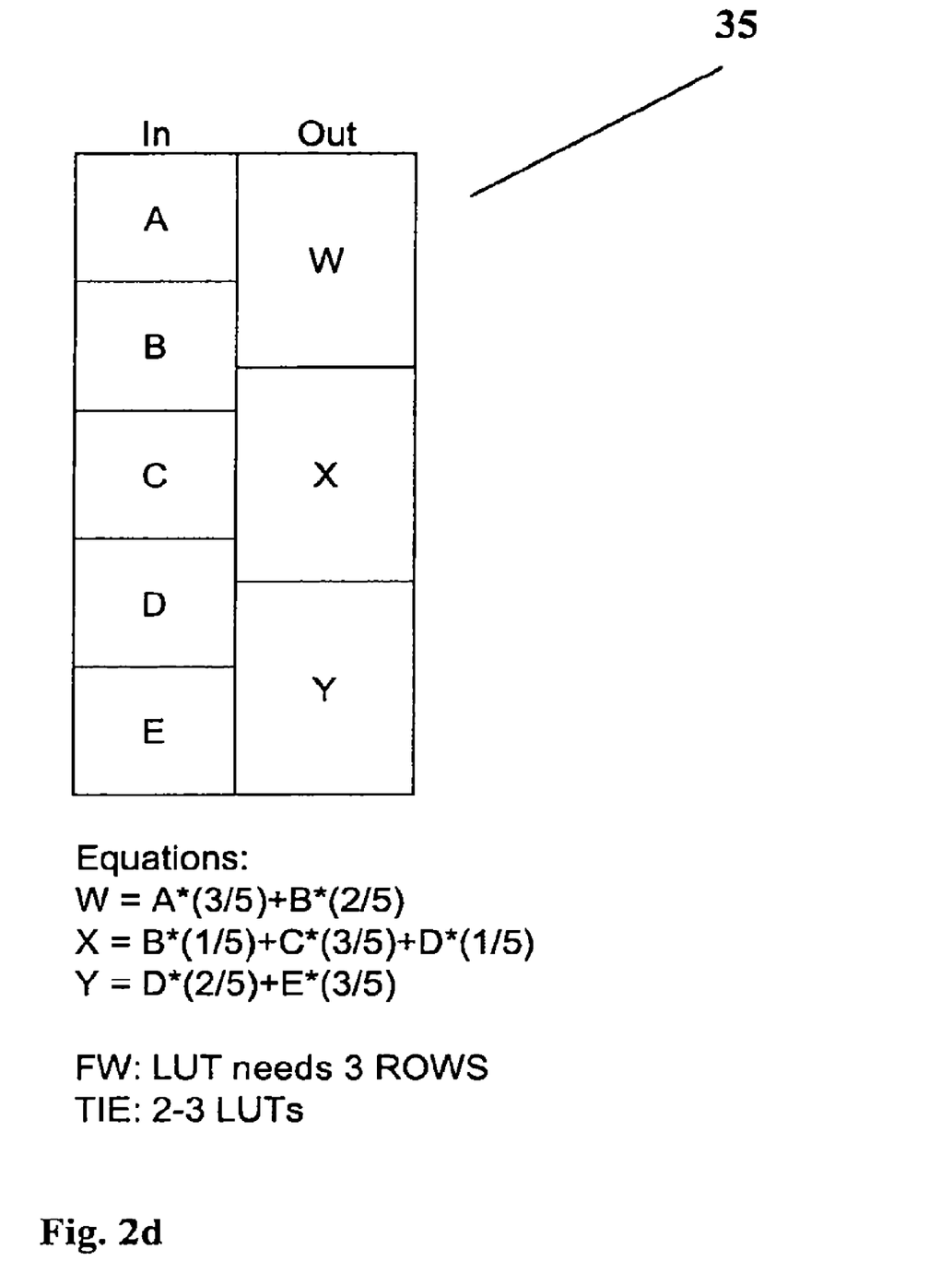
Figure 2E:
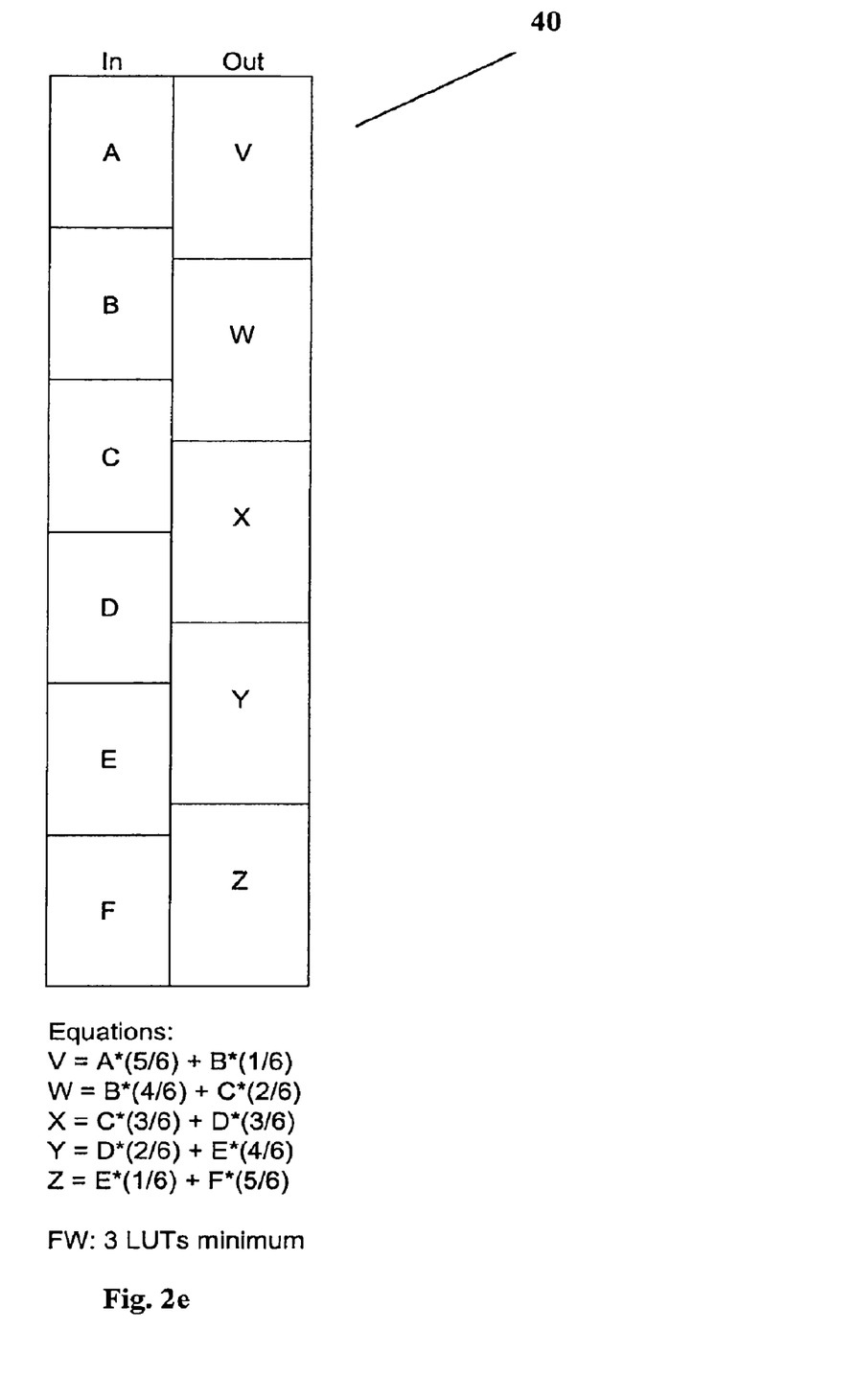
Figure 2F:
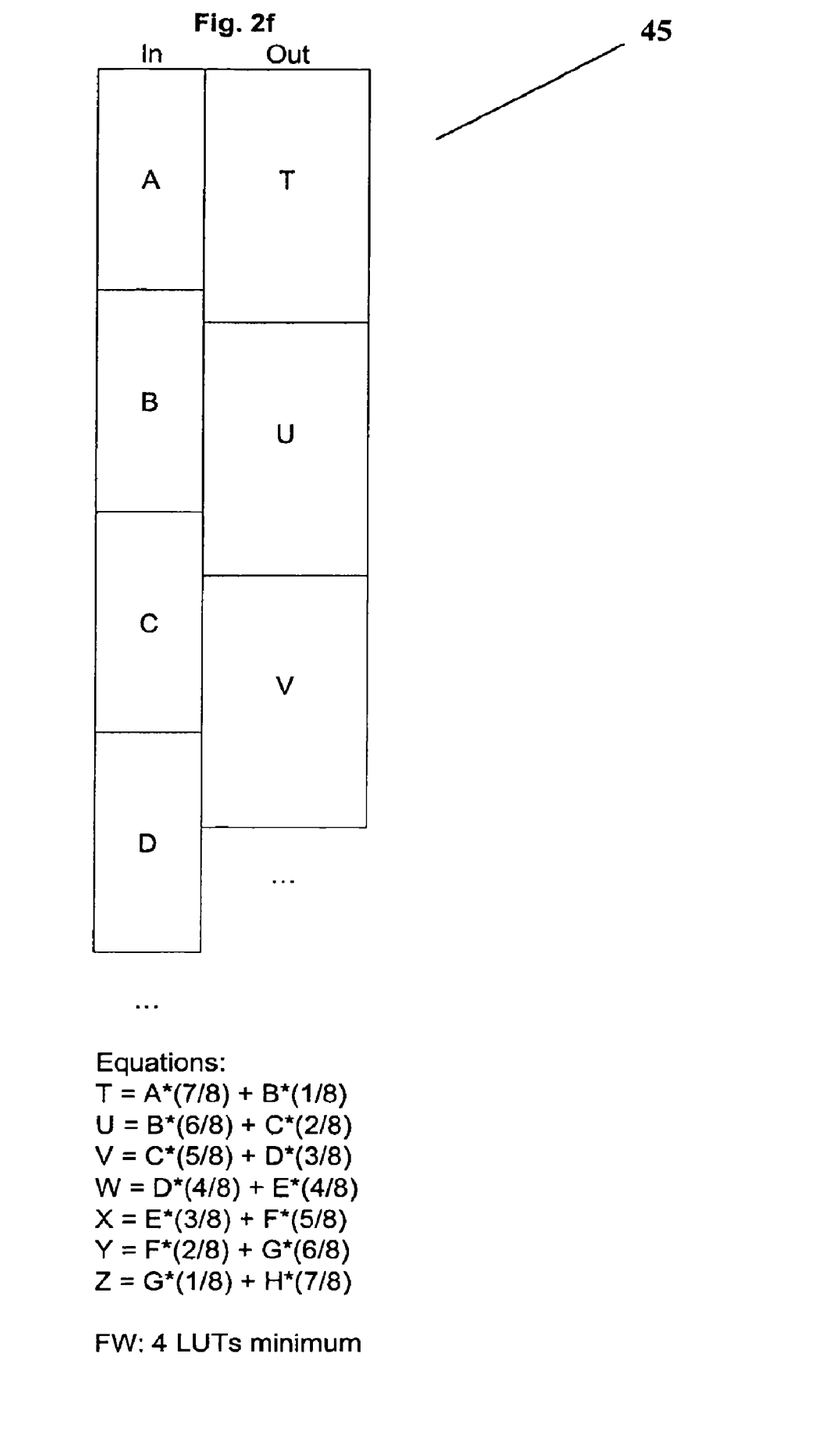

The left-hand side of FIG. 2b (labeled as "in") depicts an exemplary pattern 25 of four rows of pixels from the input image, corresponding to 4:3 scaling. After that pattern of four rows of pixels in one column (pixels A, B, C, D in FIG. 2a) is identified (is determined to be present) in the neighborhood, the following algorithms for a two bits per pixel input image provide the corresponding three pixels (pixels X, Y and Z in FIG. 2b) in the corresponding column of the scaled image $X=A*(\frac{3}{4})+B*(\frac{1}{4})$, $Y=C*(\frac{1}{2})+B*(\frac{1}{2})$, $Z=D*(\frac{3}{4})+C*(\frac{1}{4})$.

Since the coefficients are the same in for both the first and the third of the above equations, two lookup tables (LUTs) can suffice although all three lookup tables can be provided.

Patterns 30, 35, 40, 45 corresponding to 5:4 scaling, 5:3 scaling, 6:5 and 8:7 scaling are shown in FIGS. 2c, 2d, 2e and 2f respectively. FIGS. 2c, 2d, 2e and 2f also show the respective algorithms for 5:4 scaling, 5:3 scaling, 6:5 scaling and 8:7 scaling. As can be seen from FIGS. 2c, 2d, 2e, for 5:4 scaling, 5:3 scaling, 6:5 scaling and 8:7 scaling algorithms, 2 LUTs, 2 LUTs, 3 LUTs, and 4 LUTs will suffice respectively.

It should be noted that the input pixel neighborhood does not have to be identical to the predetermined pattern. Although the predetermined pattern has to be present in the input pixel neighborhood in order for the scaling algorithm to be applied, pixels in the input pixel neighborhood that are not included in the predetermined pattern will be ignored in the application of the application of the algorithm.

Figure 3A:
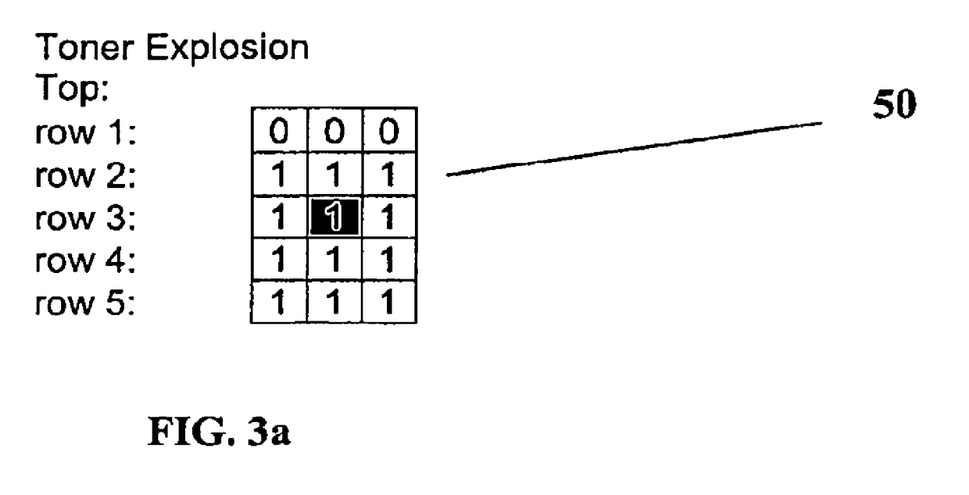
FIGS. 3a, 3b are schematic pictorial representation of exemplary embodiments of patterns for "toner scatter compensation"
Figure 3B:
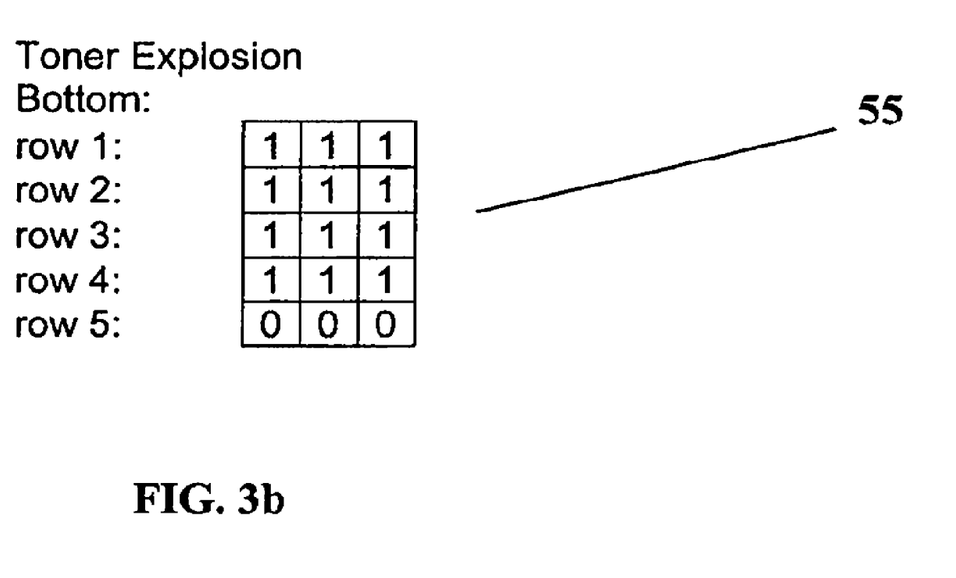

One embodiment of the method of this invention can also be applied to performing a "toner scatter compensation" algorithm on the scaled image. For a "toner scatter compensation" algorithm on the scaled image includes the steps of selecting a pixel neighborhood including a number of pixels in the scaled image neighboring a selected pixel, comparing the pixel neighborhood to a predetermined "toner scatter compensation" pattern and applying a "toner scatter compensation" algorithm to some of the pixels from the scaled image pixel neighborhood. FIG. 3a shows an exemplary "toner scatter compensation" top pattern 50 and FIG. 3b shows an exemplary "toner scatter compensation" bottom pattern 55.

In one instance, the "toner scatter compensation" algorithm is implemented by means of a lookup table (a "toner scatter compensation" lookup table). The algorithm then includes selecting (providing) pixel data from one or more pixels in the other neighborhood from the scaled image and obtaining, from the "toner scatter compensation" lookup table data, data for a corresponding pixel in the processed scaled image.

It should be noted that, although the above described embodiment of the method of this invention applies the "toner scatter compensation" algorithm to the scaled image pixels, embodiments that apply the "toner scatter compensation" algorithm to image pixels from an arbitrary input image are also within the scope of this invention.

In one instance, in one embodiment of the method of this invention, the pixel neighborhood is first compared to a "toner scatter compensation" pattern. If the "toner scatter compensation" pattern is present in the pixel neighborhood, image data from some or all of the pixels in the pixel neighborhood is processed by applying a "toner scatter compensation" algorithm. After determining whether the "toner scatter compensation" pattern was present in the pixel neighborhood and applying the "toner scatter compensation" algorithm if the pattern was present, a scaled image is obtained by applying a predetermined scaling algorithm to some or all of the pixels from the pixel neighborhood. In some instances, the above embodiment results in lower hardware cost or faster speed.

Figure 4:
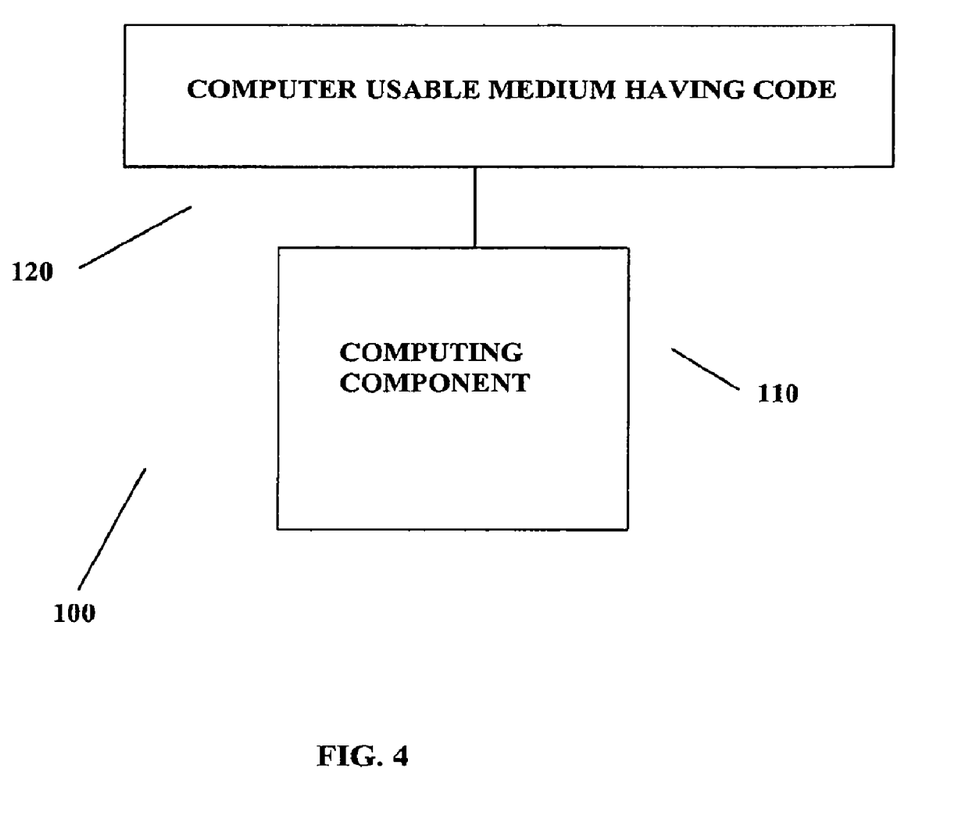
FIG. 4 a schematic block diagram representation of an embodiment of the system of this invention.

An embodiment of the system of this invention is shown in FIG. 4. Referring to FIG. 4, the embodiment 100 of the system of this invention includes a computing component 110 capable of comparing a pixel neighborhood from the input image to a pattern to determine if the pattern is present in the pixel neighborhood and one or more computer usable media 120 having computer readable code embodied therein, the computer readable code being capable of causing the computing component 110 to, if the pattern is present in the pixel neighborhood, obtain, from input image data of at least some pixels from the pixel neighborhood, scaled image pixel data by applying a predetermined scaling algorithm. The one or more computer usable media 120 are operatively connected to the computing component 110 (by means such as, but not limited to, a computer bus, a wired connection and, in some cases, a wireless connection).

In one instance, the computer readable code, in applying the predetermined scaling algorithm, causes the computing component to select and provide two or more pixels from the pattern in the pixel neighborhood and obtain pixel data for a pixel in the scaled image from a lookup table using as input data for the provided two or more input pixels from the pattern in the pixel neighborhood. In some embodiments, such as, for example, the embodiments shown in FIGS. 2b-2f, more than one lookup tables may be necessary in order to obtain data for all the pixels in the scaled image corresponding to the input image pixels in the pattern in the pixel neighborhood. In one embodiment, the computer readable code can be described as obtaining an index for the lookup table from the two or more input data pixels provided by the computing component and obtaining, from a corresponding one of the lookup tables, the scaled image pixel data for the scaled image pixel corresponding to the obtained index.

In another instance, the computer readable code is also capable of causing the computing component 110 to select a predetermined pattern. In another instance, the computer readable code is further capable of causing the computing component 110 to compare the pixel neighborhood to the predetermined pattern in order to determine whether the predetermined pattern is present in the pixel neighborhood. In one embodiment, this invention not being limited to this embodiment, the computing component 110 is an application specific integrated circuit (ASIC) and the one or more computer usable media 120 comprises a computer memory such as, but not limited to, a read only memory, ROM, or a random-access memory, RAM. In some embodiments, the one or more computer usable media 120 could be integrated in the same ASIC as the computing component 110. In another embodiment, the computing component 110 is a programmed logic array (PLA) (or a field programmable logic array (FPLA)).

In embodiments utilizing one or more lookup tables, the lookup tables could be stored in the same computer usable medium as the computer readable code or in a separate computer usable medium.

In another embodiment, the computer readable code is also capable of causing the computing component to select one pixel from the scaled image, select another pixel neighborhood including a number of pixels from the scaled image neighboring the one pixel from the scaled image and the one pixel from the scaled image, compare the another pixel neighborhood to another predetermined pattern (a "toner scatter compensation" pattern) in order to determine whether the another predetermined pattern is present in the other pixel neighborhood, and, if the another predetermined pattern is present in the another pixel neighborhood, obtain, from scaled image data for at least some pixels from the another pixel neighborhood, processed scaled image pixel data by applying a "toner scatter compensation" algorithm.

In one instance, applying the "toner scatter compensation" algorithm includes selecting (providing) pixel data from one or more pixels in the other neighborhood from the scaled image and obtaining, from a "toner scatter compensation" lookup table data, data for a corresponding pixel in the processed scaled image. It should be noted that the "toner scatter compensation" lookup table can be stored in the same computer usable medium that has the computer readable code or in a separate computer usable medium. (A lookup table can be described as being included in a data structure.)

In one exemplary embodiment, the "toner scatter compensation" pattern is given by

| 1 | 1 | 1 |
|---|---|---|
| 1 | 1 | 1 |
| 1 | 1 | 1 |
| 1 | 1 | 1 |
| 0 | 0 | 0 | and the lookup table provides the following processed image pattern

| | | |
|---|---|---|
| 1 | 1 | 1 |
| 1 | 1 | 1 |
| 0.6 | 0.6 | 0.6 |
| 1 | 1 | 1 |
| 0 | 0 | 0 | can be implemented with a small (approximately a thousand entries) lookup table. (In one exemplary embodiment, the toner algorithm is applied to the bottom three rows and the input is 1 bit per pixel image.)

It should be noted that although various embodiments of the patterns and scaling algorithms, this invention is not limited to only these patterns and scaling algorithms.

It should be noted that the computing component 110, utilizing computer readable code other than that described above, can be also be used for other applications in a printing device while at the same time providing scaling and "toner scatter" artifact correction when utilized with the computer readable code of this invention. For example, although not a limitation of this invention, the computing component 110 programmed with appropriate computer readable code, can also be used for producing images from lower resolution pixel image data bases on higher resolution output devices.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A controller comprising:
a hardware port;
wherein the controller is configured to:
determine whether a pattern is present in a pixel neighborhood based on a direct comparison of the pixel neighborhood with the pattern, the pixel neighborhood being received via the hardware port, comprising pixels neighboring a pixel from an input image, and including less pixels than an entirety of the image, the pattern being less than the pixel neighborhood; and
apply a scaling algorithm to at least a portion of the pixel neighborhood in order to obtain a scaled image if the pattern is present in the pixel neighborhood.

2. The controller of claim 1
wherein the controller, in applying the scaling algorithm, is configured to:
provide pixel data from at least two pixels in the pixel neighborhood; and
obtain, from at least one look-up table, pixel data for at least one pixel in the scaled image.

3. The controller of claim 2 further configured to:
select another pixel neighborhood, the another pixel neighborhood comprising a plurality of pixels neighboring a pixel in the scaled image;
compare at least part of the another pixel neighborhood to another pattern in order to determine whether the another pattern is present in the another pixel neighborhood; and
apply a correction algorithm to at least a portion of the another pixel neighborhood in order to obtain a processed scaled image if the another pattern is present in the another pixel neighborhood.

4. The controller of claim 3
wherein the controller, in applying the correction algorithm, is configured to:
provide pixel data from at least two pixels in the another pixel neighborhood; and
obtain pixel data for at least one pixel in the processed scaled image from a look-up table for correction.

5. The controller of claim 1
wherein the controller is further configured to select the pixel neighborhood.

6. The controller of claim 3
wherein the controller is further configured to select the another pixel neighborhood.

7. The controller of claim 1
wherein the pattern comprises at least two pixels.

8. The controller of claim 1
wherein the pattern is one of a plurality of patterns, each pattern of the plurality comprising a different number of pixels.

9. The controller of claim 1
wherein the pattern is one of a plurality of patterns, each pattern of the plurality comprising a different spatial arrangement of pixels.

10. The controller of claim 1
wherein the hardware port is configured to communicate using a wired connection or a wireless connection.

11. The controller of claim 1, wherein the controller is further configured to use the scaled image for printing.

12. A controller comprising:
a hardware port;
wherein the controller is configured to:
determine whether a pattern is present in a pixel neighborhood based on a direct comparison of the pixel neighborhood with the pattern, the pixel neighborhood being received via the hardware port, comprising pixels neighboring a pixel from an input image, and including less pixels than an entirety of the image, the pattern being less than the pixel neighborhood;
apply a correction algorithm to at least a portion of the pixel neighborhood in order to obtain a processed image if the pattern is present in the pixel neighborhood;
select another pixel neighborhood, the another pixel neighborhood comprising a plurality of pixels neighboring a pixel in the processed image;

compare at least part of the another pixel neighborhood to another pattern in order to determine whether the another pattern is present in the another pixel neighborhood; and apply a scaling algorithm to at least a portion of the another pixel neighborhood in order to obtain a processed scaled image if the another pattern is present in the another pixel neighborhood.

13. The controller of claim 12 wherein the controller, in applying the correction algorithm, is configured to:
provide pixel data from at least two pixels in the pixel neighborhood; and
obtain, from a look-up table for correction, pixel data for at least one pixel in the processed image.

14. The controller of claim 12 wherein the controller, in applying the scaling algorithm, is configured to:
provide pixel data from at least two pixels in the another pixel neighborhood; and
obtain, from at least one look-up table, pixel data for at least one pixel in the processed scaled image.

15. The controller of claim 12 wherein the controller is further configured to select the pixel neighborhood.

16. The controller of claim 12 wherein the pattern comprises at least two pixels.

17. The controller of claim 12 wherein the pattern is one of a plurality of patterns, each pattern of the plurality comprising a different number of pixels.

18. The controller of claim 12 wherein the pattern is one of a plurality of patterns, each pattern of the plurality comprising a different spatial arrangement of pixels.

19. The controller of claim 12 wherein the hardware port is configured to communicate using a wired connection or a wireless connection.

20. The controller of claim 12, wherein the controller is further configured to use the processed scaled image for printing.

* * * * *